May 26, 1953 P. MARTIN 2,639,678
DISPENSER
Filed April 29, 1950

PHILIP MARTIN
INVENTOR.

BY Lyon+Lyon
ATTORNEYS.

Patented May 26, 1953

2,639,678

UNITED STATES PATENT OFFICE 2,639,678

DISPENSER

Philip Martin, North Hollywood, Calif., assignor to Foster's Freeze National Corporation, Los Angeles, Calif., a corporation of California Application April 29, 1950, Serial No. 158,966

11 Claims. (Cl. 107—1)

This invention relates to an improved device for mixing flavoring material or the like with ice cream, iced milk, frozen mix or the like.

It is an object of this invention to provide a device whereby chocolate or other suitable flavoring material can be embedded in and intermixed with ice cream or other similar frozen mix.

It is an object of this invention to provide a device wherein the component parts are readily accessible for cleansing or repair.

It is a further object of this invention to provide a device where the amount of flavoring material is varied in accordance with the amount of frozen mix drawn off through the device.

The device generally comprises a sleeve member provided with suitable apertures for admitting frozen mix and flavoring material, is adapted to receive a rotatable plug member having apertures corresponding to the apertures in the sleeve, and suitable means are provided to be inserted in said plug member to disperse the flavoring material throughout the frozen mix.

Other objects and advantages of this device will be apparent from the following description.

Figure 1:
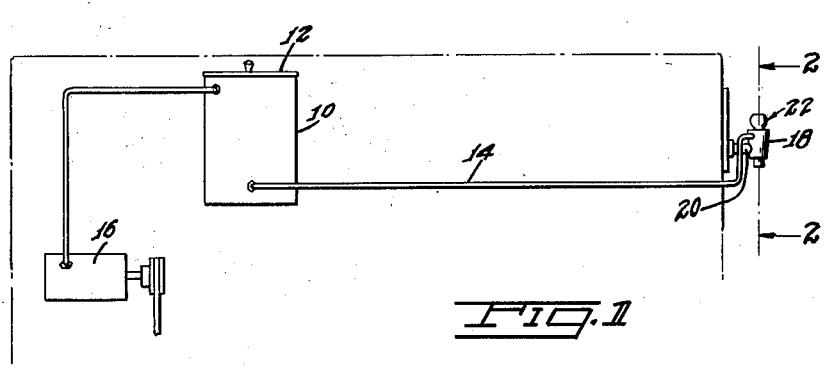
Figure 1 is a schematic view of the flavoring material supply system.
Figure 2:
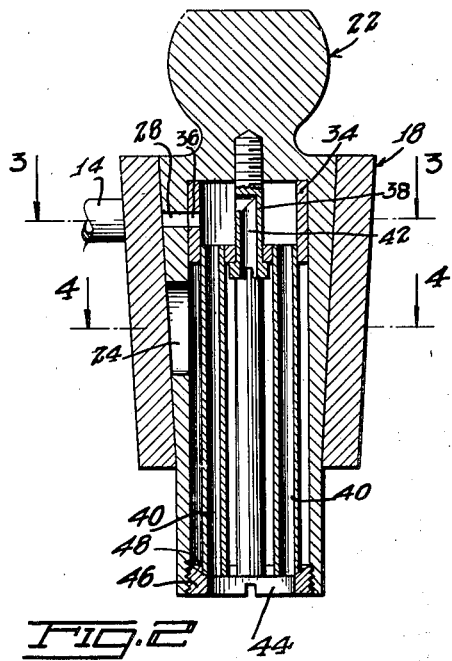
Figure 2 is a section taken along the line 2—2 of the Figure 1.
Figure 5:
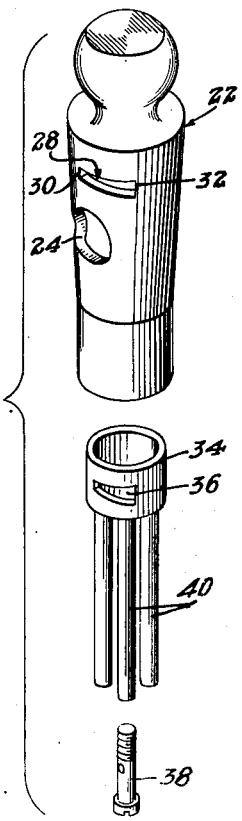
Figure 5 is a perspective view of the component parts of the device.
Figures 3, 4:
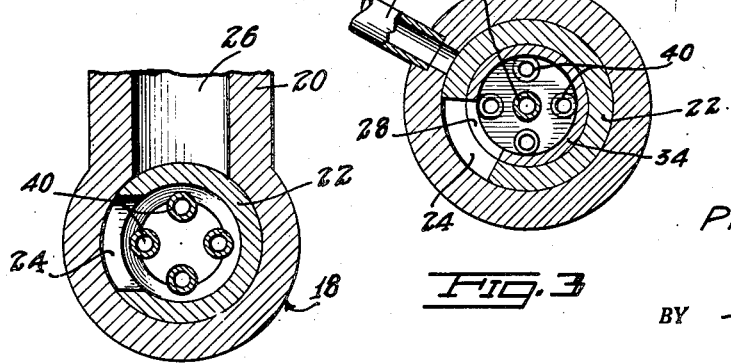
Figure 3 is a section taken along the line 3—3 of Figure 2.
Figure 4 is a section view taken along the line 4—4 of Figure 2.

Referring now to Figure 1, the flavoring material may be stored in a container 10, which is provided with a lid 12 to permit refilling of the container. The flavoring material is forced from the container through line 14 by means of a pump 16. The material enters a sleeve 18 through a suitable opening. The frozen mix with which the flavoring material is to be mixed enters the sleeve through pipe 20 from any suitable source. A plug member 22 is adapted to fit within the sleeve 18. It is preferred that the sleeve be tapered as best seen in Figure 2, and that the plug member 22 be correspondingly tapered to hold the plug member in the proper position.

The plug member is provided with an aperture 24, which is approximately the same size as the opening 26 in the sleeve 18 admitting mix into the sleeve. It is apparent that by rotating the plug member 22 until the aperture 24 opposes opening 26, the frozen mix will be admitted into the plug member 22. The amount of frozen mix admitted into the plug member will be determined by the amount that aperture 24 opposes the opening 26. Plug member 22 is provided with the slot 28, which is so positioned to oppose line 14 when the plug member 22 is positioned so that aperture 24 opposes opening 26. It is preferred to construct the slot 28 so that the leading edge 30 is narrower than the trailing edge 32. This construction insures a relatively constant proportion of flavoring material embedded in the frozen mix, for when aperture 24 first opposes opening 26 a relatively small amount of frozen mix is admitted into the plug member 22. Correspondingly, the small leading edge of slot 28 opposes the line 14, admitting a relatively small amount of flavoring material. As plug member 22 is rotated, the larger trailing edge 32 of slot 28 opposes line 14, admitting a greater amount of flavoring material. At the same time, the aperture 24 will be fully opened with respect to pipe 20, permitting the large amount of frozen mix to enter into plug member 22.

A cup 34, provided with a slot 36 corresponding to the slot 28, is adapted to be retained inside plug member 22 by a screw 38, so that the flow of flavoring material into the plug member will be permitted through slot 28 and slot 36 into the cup 34. A plurality of fingers 40 may be provided depending from the cup member 34 to permit flow of the flavoring material through said fingers.

Though four fingers are shown in this embodiment it is apparent that the number may be varied. The screw 38 may be provided with a central passage 42 to permit flow of the flavoring material through said screw. In this manner, the flavoring material will be embedded in the mix in substantially continuous ribbons.

It has been found that the flow of mix through aperture 24 and out discharge opening 44 frequently interrupts or obstructs the flow of flavoring material through the fingers 40. It is desirable, therefore, to provide a bushing 46 which screws into the lower extremity of plug member 22. This bushing is provided with a tapered portion 48 which fits between the fingers 40 and the wall of the plug member 22. This bushing then diverts the flow of mix between the fingers 40 and through the discharge opening 44, eliminating any obstruction or back-pressure in the fingers 40 and permitting free flow of flavoring material.

The operation of this device is as follows. Frozen mix is admitted through pipe 20 into the sleeve 18. Plug member 22 is rotated until aperture 24 opposes the opening 26 from said pipe 20 into the sleeve, thus permitting flow of frozen mix into the plug member and through discharge opening 44. The flavoring material is forced through line 14 through slots 28 and 36 into the cup 34. The flavoring material then passes through fingers 40 and through the central passage 42 in the screw 38 and becomes embedded in the frozen mix as it discharges opening 44.

While the above description is of the preferred embodiment of this invention, it is apparent that changes in the shape, size and location of the various parts of this device can be resorted to without departing from the scope of this invention or of the appended claims.

I claim:

1. A device for mixing flavoring material with frozen mix comprising: a sleeve provided with an inlet for frozen mix and an inlet for flavoring material, a hollow rotatable plug member fitted within said sleeve and closing one end thereof and provided with an opening corresponding to the inlet for frozen mix and an opening corresponding to said inlet for flavoring material so positioned that said openings register with said inlets at the same time upon rotation of said plug member, a cup member secured within said hollow plug member and having an opening registering with said opening for flavoring material in said plug member and provided with at least one discharge opening.

2. A device for mixing flavoring material with frozen mix comprising: a sleeve provided with an inlet for frozen mix and an inlet for flavoring material, a hollow rotatable plug member fitted within said sleeve and closing one end thereof and provided with an opening corresponding to the inlet for frozen mix and an opening corresponding to said inlet for flavoring material so positioned that said openings register with said inlets at the same time upon rotation of said plug member, a cup member secured within said hollow plug member and provided with an opening registering with the opening for flavoring material in said plug member, and at least one tube member depending from said cup member.

3. A device for mixing flavoring material with frozen mix comprising: a tapered sleeve provided with an inlet for frozen mix and an inlet for flavoring material, a hollow rotatable tapered plug member fitted within said sleeve and closing one end thereof and provided with an opening corresponding to the inlet for frozen mix and an opening corresponding to said inlet for flavoring material so positioned that said openings register with said inlets at the same time upon rotation of said plug member, a cup member secured within said hollow plug member and provided with an opening registering with the opening for flavoring material in said plug member, and at least one tube member depending from said cup member.

4. A device for mixing flavoring material with frozen mix comprising: a tapered sleeve provided with an inlet for frozen mix and an inlet for flavoring material positioned above said inlet for frozen mix, a hollow rotatable tapered plug member fitted within said sleeve and closing one end thereof and provided with an opening corresponding to the inlet for frozen mix and an opening corresponding to said inlet for flavoring material so positioned that said openings register with said inlets at the same time upon rotation of said plug member, a cup member secured within said hollow plug member and provided with an opening registering with the opening for flavoring material in said plug member, and at least one tube member depending from said cup member.

5. A device for mixing flavoring material with frozen mix comprising: a sleeve provided with an inlet for frozen mix and an inlet for flavoring material, a hollow rotatable plug member fitted within said sleeve and closing one end thereof and provided with an opening corresponding to the inlet for frozen mix and an opening corresponding to said inlet for flavoring material so positioned that said openings register with said inlets at the same time upon rotation of said plug member, a cup member secured within said hollow plug member and provided with an opening registering with the opening for flavoring material in said plug member, and at least one tube member depending from said cup member, a bushing retained between the extremity of said tube members and said plug member.

6. A device for mixing flavoring material with frozen mix comprising: a tapered sleeve provided with an inlet for frozen mix and an inlet for flavoring material, a hollow rotatable tapered plug member fitted within said sleeve and closing one end thereof and provided with an opening corresponding to the inlet for frozen mix and an opening corresponding to said inlet for flavoring material so positioned that said openings register with said inlets at the same time upon rotation of said plug member, a cup member secured within said hollow plug member and provided with an opening registering with the opening for flavoring material in said plug member, and at least one tube member depending from said cup member, a bushing retained between the extremity of said tube members and said plug member.

7. A device for mixing flavoring material with frozen mix comprising: a tapered sleeve provided with an inlet for frozen mix and an inlet for flavoring material positioned above said inlet for frozen mix, a hollow rotatable tapered plug member fitted within said sleeve and closing one end thereof and provided with an opening corresponding to the inlet for frozen mix and an opening corresponding to said inlet for flavoring material so positioned that said openings register with said inlets at the same time upon rotation of said plug member, a cup member secured within said hollow plug member and provided with an opening registering with the opening for flavoring material in said plug member, and at least one tube member depending from said cup member, a bushing retained between the extremity of said tube member and said plug member.

8. A device for mixing flavoring material with frozen mix comprising: a sleeve provided with an inlet for frozen mix and an inlet for flavoring material, a hollow rotatable plug member fitted within said sleeve and closing one end thereof and provided with an opening corresponding to said opening for frozen mix in said sleeve and a slot of increasing width from its leading edge to its trailing edge so positioned on said plug member that the leading edge will register with the inlet for flavoring material in said sleeve when the opening for frozen mix in the plug member first registers with the inlet for frozen mix.

9. A device for mixing flavoring material with frozen mix comprising: a sleeve provided with an inlet for frozen mix and an inlet for flavoring material, a hollow rotatable plug member fitted within said sleeve and closing one end thereof and provided with an opening corresponding to said opening for frozen mix in said sleeve and a slot of increasing width from its leading edge to its trailing edge so positioned on said plug member that the leading edge will register with the inlet for flavoring material in said sleeve when the opening for frozen mix in the plug member first registers with the inlet for frozen mix, a cup member secured within said plug member having a slot registering with the slot for flavoring material in said plug member and provided with at least one discharge opening.

10. A device for mixing flavoring material with frozen mix comprising: a sleeve provided with an inlet for frozen mix and an inlet for flavoring material, a hollow rotatable plug member fitted within said sleeve and closing one end thereof and provided with an opening corresponding to said opening for frozen mix in said sleeve and a slot of increasing width from its leading edge to its trailing edge so positioned on said plug member that the leading edge will register with the inlet for flavoring material in said sleeve when opening for frozen mix in the plug member first registers with the inlet for frozen mix, a cup member secured within said plug member having a slot registering with the slot for flavoring material in said plug member, and at least one tube member depending from said cup member.

11. A device for mixing flavoring material with frozen mix comprising: a sleeve provided with an inlet for frozen mix and an inlet for flavoring material, a hollow rotatable plug member fitted within said sleeve and closing one end thereof and provided with an opening corresponding to said opening for frozen mix in said sleeve and a slot of increasing width from its leading edge to its trailing edge so positioned on said plug member that the leading edge will register with the inlet for flavoring material in said sleeve when opening for frozen mix in the plug member first registers with the inlet for frozen mix, a cup member secured within said plug member having a slot registering with the slot for flavoring material in said plug member, and at least one tube member depending from said cup member, a bushing adapted to be retained between the extremity of said tube members and said plug member.

PHILIP MARTIN.

References Cited in the file of this patent

UNITED STATES PATENTS

| Number | Name | Date |
| --- | --- | --- |
| 2,032,163 | Bagby | Feb. 25, 1936 |
| 2,099,252 | Bagby | Nov. 16, 1937 |
| 2,282,313 | Hershey | May 12, 1942 |